United States Patent Office 2,742,513
Patented Apr. 17, 1956

2,742,513

DIMERIZATION OF MONOALKYL BENZENES

Abraham Schneider, Philadelphia, Pa., assignor to Sun Oil Company, Philadelphia, Pa., a corporation of New Jersey No Drawing. Application September 22, 1953,
Serial No. 381,751

11 Claims. (Cl. 260—668)

This invention relates to a process for the dimerization of monoalkyl benzenes to produce unsymmetrical diarylalkanes.

The dimerization of polyalkyl benzenes under the influence of branched chain olefins and Friedel-Crafts catalysts has heretofore been described. In such processes, it was found essential, in order to produce an unsymmetrical diarylalkane, to employ a polyalkyl benzene having two alkyl substituents in para relationship.

It has now been found that certain monoalkyl benzenes can be dimerized by contacting the same with a tertiary alkyl halide in the presence of aluminum chloride or aluminum bromide, the contacting being performed under specific reaction conditions as hereinafter described. For example, a specific embodiment of this invention provides a process for dimerization of ethylbenzene by contacting ethylbenzene with t-butyl chloride in the presence of aluminum chloride at a temperature of from 50 to 85° C. The product formed is the dimer of ethylbenzene, which is 1-phenyl-1-p-ethylphenylethane, it being understood that minor quantities of the ortho and meta isomers thereof are also formed. This reaction is illustrated by the equation:

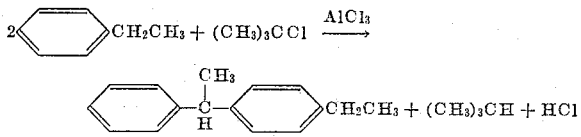

The formation of the paraffin corresponding to the t-alkyl halide is always observed in this reaction and is characteristic thereof.

Monoalkyl benzenes which can be employed in the process of the invention have the formula

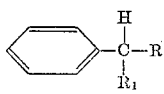

wherein R is an alkyl radical or a cycloalkyl radical having from 1 to 20 carbon atoms, and wherein $R_1$ is an alkyl radical or a cycloalkyl radical having from 1 to 20 carbon atoms, or a hydrogen atom. The alkyl benzene thus has at least two carbon atoms in the alkyl group, and at least one hydrogen atom is attached to the carbon atom of the alkyl group which is joined to the benzene nucleus. The dimer products of the process are unsymmetrical diarylalkanes and have the formula

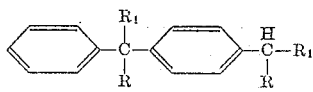

and are formed as above shown for the dimerization of ethylbenzene; R and $R_1$ are as above described. Ethylbenzene and cumene (isopropylbenzene) are preferred reactants in the present process. Other monoalkyl benzenes which may be employed include, for example, n-propylbenzene, secondary butylbenzene, isobutylbenzene, secondary amylbenzene, 1-phenyl-3-methylbutane, phenylcyclohexylmethane, 1-phenyl-2-cyclohexylethane and the like. The monoalkyl benzene reactant is preferably substantially free of other hydrocarbons, and best results are obtained when the presence of other hydrocarbons is maintained below 10%. However, hydrocarbons which do not react under the conditions employed, such as normal paraffins, may be present to an extent of about 40% without adversely affecting the reaction. Isoparaffins react under the conditions employed in the process, and hence they should not be present to an appreciable extent. Mononuclear aromatics other than the monoalkyl benzene reactant, such as benzene, should not be present in appreciable amounts, since they react with the monoalkyl benzene under the conditions herein employed as described in application Serial No. 381,753, filed September 22, 1953.

The t-alkyl halide to employ must be a t-alkyl chloride or a t-alkyl bromide. By "t-alkyl halide," and terms of similar import, is meant an alkyl halide wherein the halogen atom is attached to a tertiary carbon atom, i. e. an alkyl halide wherein the halogen atom is attached to a carbon atom, which carbon atom in turn is attached to 3 other carbon atoms. Tertiary butyl chloride is the preferred alkyl halide. Other alkyl halides which can be employed include, for example, 2-chloro-2-methylbutane, 2-chloro-2-methylpentane, 3-chloro-3-ethylpentane, t-butylbromide, 2-bromo-2-methylbutane, and homologues thereof. Secondary chlorides and bromides, i. e., halides wherein the halogen atom is attached to a secondary carbon atom, which have at least 4 carbon atoms are rearranged under the conditions of the reaction to a corresponding tertiary halide, and can be employed in the process. Secondary halides which can be employed are illustrated by secondary butyl chloride, secondary butyl bromide, 1-chloro-1-methylbutane, and 1-chloro-1-ethylbutane. It is preferred, however, to employ tertiary halides as above described.

Aluminum chloride is the preferred catalyst to employ. However, aluminum bromide can be used under the same conditions of reaction as aluminum chloride, and gives good results especially where the tertiary alkyl halide employed is a tertiary alkyl bromide.

The mole ratio of tertiary alkyl halide to monoalkyl benzene is preferably maintained within the range of from 0.1:1 to 1:1. The quantity of aluminum chloride to employ is not critical but is advantageously maintained within a mole ratio of aluminum chloride to tertiary halide of from 0.05:1 to 1:1.

It is essential to the successful operation of the present process that the temperature of reaction be maintained within the range of from 50° C. to 85° C. At temperatures of from 0 to 25° C., alkylation of the monoalkyl aromatic by the tertiary or secondary alkyl halide is substantially the only reaction obtained. At a temperature of from 25 to 50° C., the same alkylation is the primary reaction, and disproportionation of the monoalkyl benzene occurs to a substantial extent. At temperatures above 85° C., a wide variety of products is obtained due to reactions of the product under the influence of the catalyst. Accordingly, it is essential that the temperature of reaction be maintained within the range of from 50 to 85° C. in order to obtain the desired product. The pressure to employ is not critical so long as reaction is maintained in the liquid phase. In general the pressure will vary from atmospheric up to about 500 p. s. i. Time is also not considered a critical variable, it being apparent that sufficient time should be allowed to obtain a substantial yield of the desired product. The usual time of reaction will be from 10 minutes to about 5 hours.

In carrying out the process of the invention, the tertiary alkyl halide and aluminum halide catalyst should not be contacted in the absence of the monoalkyl benzene. A preferred method of performing the process is to admix the monoalkyl benzene and catalyst and to then add tertiary alkyl halide, with agitation, to the mixture.

The following examples illustrate embodiments of the invention:

*Example 1*

Into a reactor equipped with agitating means and temperature control means was introduced 150 grams (1.41 moles) of ethylbenzene and 10 grams of aluminum chloride. To this continuously agitated mixture was added 50 grams (0.538 mole) t-butyl chloride over a period of 120 minutes. The temperature of the reaction mixture was maintained within the range of from 55 to 60° C. Isobutane evolved in the reaction was continuously removed from the reactor. The reaction mixture was allowed to stratify and the organic layer separated from the catalyst layer. The organic layer was distilled to separate the components thereof. There was recovered about 25 g. (0.119 mole) of the dimer of ethylbenzene, 1-phenyl-1-p-ethylphenylethane.

Other products of the reaction consisted of isobutane, 18.5 g. (0.318 mole); benzene, 13.2 g. (0.17 mole); ethylbenzene, 35.2 g. (0.332 mole); t-butylbenzene, 9.1 g. (0.068 mole); diethylbenzene, 21.3 g. (0.159 mole); and about 9.5 g. of high boiling material.

This example shows substantial production of the unsymmetrical diarylalkane dimer of ethylbenzene in accordance with the invention, and that while other reactions also occur to some extent, such as disproportionation of the monoalkylbenzene, no production of t-butylethylbenzene, which would be the alkylation product of ethylbenzene and t-butyl chloride, was observed.

*Example 2*

The procedure of Example 1 was substantially repeated substituting cumene for ethylbenzene. To a mixture of 100 g. (0.833 mole) of cumene and 10 g. of $AlCl_3$ was added 50 g. (0.538 mole) of t-butyl chloride over a period of 65 minutes. The reaction mixture was maintained at a temperature of 60° C. during reaction. There was recovered about 11 g. (0.046 mole) of the dimer of cumene, 2-phenyl-2-p-isopropylphenylpropane.

Other products consisted of benzene, 8.8 g. (0.11 mole); cumene, 23.5 g. (0.20 mole); diisopropylbenzene, 11.7 g. (0.072 mole); and about 11.5 g. of higher boiling material. No t-butylcumene, which would be the alkylation product of cumene and t-butyl chloride, was observed.

*Example 3*

The procedure of Example 2 was substantially repeated, using the same reactants, except that the temperature of reaction was maintained at 25° C. instead of 60° C. In addition to the products obtained in Example 2, there were also obtained substantial amounts of t-butylcumene (7.4 g.), t-butylbenzene (9.4 g.), and 2,2-diphenylpropane (3.5 g.).

This example shows the importance of using a temperature of reaction of at least 50° C. to prevent formation of the product of alkylation between the monoalkyl benzene and the t-alkyl halide.

The diarylalkane products of the present process can be used as lubricating oil additives, intermediates in the preparation of detergents, for the synthesis of other compounds, and the like.

When other monoalkyl benzenes and t-alkyl halides, as above described, are employed, results substantially equivalent to those of the above illustrative examples are obtained.

The invention claimed is:

1. Process of preparing unsymmetrical diarylalkane hydrocarbons which comprises reacting in liquid phase at a temperature of from 50° C. to 85° C. in the presence of a catalyst selected from the group consisting of aluminum chloride and aluminum bromide, an alkyl halide having at least four carbon atoms selected from the group consisting of tertiary and secondary alkyl chlorides and tertiary and secondary alkyl bromides with a monoalkyl benzene having the formula

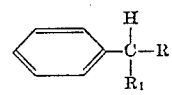

wherein R is a material selected from the group consisting of alkyl radicals having from 1 to 20 carbon atoms and cycloalkyl radicals having from 1 to 20 carbon atoms, and wherein $R_1$ is a material selected from the group consisting of a hydrogen atom, alkyl radicals having from 1 to 20 carbon atoms and cycloalkyl radicals having from 1 to 20 carbon atoms.

2. Process of dimerizing a monoalkyl benzene which comprises reacting in liquid phase at a temperature of from 50° C. to 85° C. in the presence of aluminum chloride, a t-alkyl chloride and a monoalkyl benzene having the formula

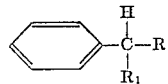

wherein R is a material selected from the group consisting of alkyl radicals having from 1 to 20 carbon atoms and cycloalkyl radicals having from 1 to 20 carbon atoms, and wherein $R_1$ is a material selected from the group consisting of a hydrogen atom, alkyl radicals having from 1 to 20 carbon atoms and cycloalkyl radicals having from 1 to 20 carbon atoms.

3. Process according to claim 2 wherein said monoalkyl benzene is ethylbenzene.

4. Process according to claim 2 wherein said monoalkyl benzene is cumene.

5. Process according to claim 2 wherein said monoalkyl benzene is n-propylbenzene.

6. Process according to claim 2 wherein said monoalkyl benzene is secondary butylbenzene.

7. Process according to claim 2 wherein said monoalkyl benzene is secondary amylbenzene.

8. Process for preparing 1-phenyl-1-p-ethylphenylethane which comprises contacting ethylbenzene with t-butyl chloride and aluminum chloride in liquid phase at a temperature of from 50° C. to 85° C., and separating 1-phenyl-1-p-ethylphenylethane from the reaction mixture.

9. Process according to claim 8 wherein the t-butyl chloride is added to a mixture of ethylbenzene and aluminum chloride.

10. Process for preparing 2-phenyl-2-p-isopropylphenylpropane which comprises contacting cumene with t-butyl chloride and aluminum chloride in liquid phase at a temperature of from 50° C. to 85° C., and separating 2-phenyl-2-p-isopropylphenylpropane from the reaction mixture.

11. Process according to claim 10 wherein the t-butyl chloride is added to a mixture of cumene and aluminum chloride.

References Cited in the file of this patent

UNITED STATES PATENTS

| | | |
|---|---|---|
| 2,526,896 | Ipatieff et al. | Oct. 24, 1950 |
| 2,673,224 | Kennedy et al. | Mar. 23, 1954 |